3,472,546
RESILIENT AUTOMOBILE SIDE BUMPER
George A. Samuels, 8843 S. Wallace St.,
Chicago, Ill. 60620
Filed June 19, 1967, Ser. No. 647,080
Int. Cl. B60r 13/00, 27/00
U.S. Cl. 293—1                                   4 Claims

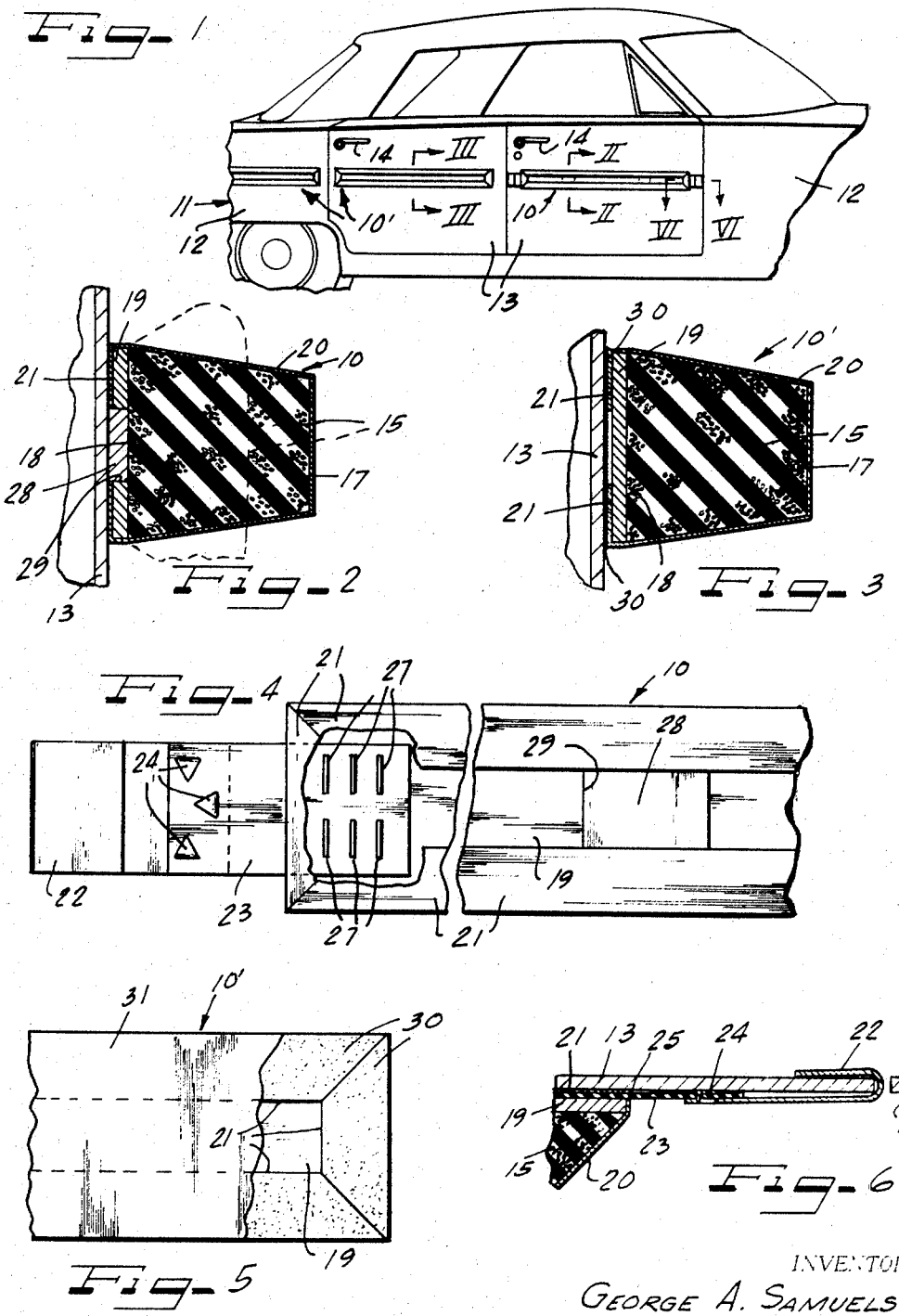
Oct. 14, 1969 — G. A. SAMUELS — 3,472,546
RESILIENT AUTOMOBILE SIDE BUMPER
Filed June 19, 1967
INVENTOR.
GEORGE A. SAMUELS United States Patent Office
3,472,546
Patented Oct. 14, 1969

ABSTRACT OF THE DISCLOSURE

Buffer strips comprising stiffened cushion bodies are attached horizontally along the surfaces of an automobile side including the doors to receive impact of swung open door edges of closely parked automobiles.

---

This invention relates to protective buffer strips, and more particularly relates to such strips especially adapted for selective attachment horizontally along the sides of automobiles to protect the finish thereof from damage by inadvertently or carelessly impinged edges of swung open doors of closely parked automobiles.

Probably the most frequent cause of damage to the outside surface finish along the sides of automobiles is the impingement thereagainst of the edges of swung open doors of closely parked automobiles. This causes nicking, scratching, denting at the point or in the area of impact. Since most automobiles have the sides, including the doors which are flush with and form continuations of the side panels of the automobile body, bulged outwardly along a generally horizontal line partway up from the lower edge and generally somewhere adjacent to but below the door handles, such bulged area generally receives impact from the edges of swung open doors of adjacent vehicles. Some automobiles are provided with so-called rub rails made of metal along this bulged area, but those are frequently dented and deformed and become unsightly. Many vehicles do not have any protective means along the bulged area supplied as original equipment. As a result the finish along such area, at least, of practically every automobile that must be parked in a parking area parallel with other vehicles will sustain the type of damage alluded to above unless protective measures are taken.

It is, accordingly, an important object of the present invention to provide new and improved protective buffer strip means adapted for selective attachment along a surface to be protected from the possibly damaging impingement thereagainst of an object.

Another object of the invention is to provide novel protective buffer strip means selectively attachable to a surface to be protected.

A further object of the invention is to provide novel buffer strip means which is attachable to a surface to be protected in a manner to prevent or at least discourage unauthorized removal.

Still another object of the invention is to provide a protective buffer strip especially adapted for application to the side of a vehicle and which is adapted to blend in with the color of the vehicle surface to which applied.

A yet further object of the invention is to provide a protective buffer strip of the character indicated which is self sustaining in structure but is sufficiently pliable to adapt to horizontal contours of a surface to which the strip is applied horizontally.

According to general features of the invention, a protective buffer strip is provided which comprises an elongated resiliently flexible cushioning body of substantial thickness having a cushioning ridge and a back portion, with stiffening means extending along the back portion. Means are provided on the back portion for securing the strip with the back portion extending along a surface to be protected and with the cushioning ridge projecting away from the surface to receive and cushion impact of an object moved toward the surface and which would thus impinge with possibly damaging effect against the surface, but by compression of the body of the strip toward the back portion thereof under impact of the object the object is prevented from striking the surface.

Other objects, features and advantages of the present invention will be readily apparent from the following detailed description of certain preferred embodiments thereof taken in conjunction with the accompanying drawing in which:

FIGURE 1 is a fragmentary side elevational view of an automobile demonstrating use of the buffer strips of the present invention;

FIGURE 2 is an enlarged fragmentary sectional detail view taken substantially on line II—II of FIGURE 1;

FIGURE 3 is an enlarged fragmentary sectional detail view taken substantially on the line III—III of FIGURE 1;

FIGURE 4 is a fragmental back face elevational view of one of the buffer strips of FIGURE 1;

FIGURE 5 is a fragmentary back face elevational view of another of the buffer strips of FIGURE 1; and FIGURE 6 is a fragmentary sectional detail view taken substantially along the line VI—VI of FIGURE 1.

Protective buffer strips 10, 10' are especially useful for application to the outer side surface or surfaces of a vehicle 11 (FIG. 1), shown as being an automobile, but which may be a truck, station wagon, and the like, having outer wall surfaces desirably protected against impingement by a damaging object such as a vehicle door edge. In the illustrated vehicle side panels 12 have therein one or more doors 13 of the usual panel construction to lie flush with the side panels 12 in the closed condition of the doors, and provided on their upper portions with the usual respective handles 14. Application of the buffer strips 10, 10' is horizontally along that portion of the panels 12 or doors 13 most liable to be struck by a damaging object, such as the swung open door of an adjacently parked vehicle, or the like, and if preferred, of course, a plurality of the buffer strips may be applied in vertically spaced, longitudinally extending relation,. As shown, the buffer strips are disposed in generally longitudinal alignment substantially upwardly from the bottom of the vehicle side, and adjacently below the handles 14 where in most vehicle exteriors the side bulges to its greatest prominence and is thus most liable to the damage indicated from an impinging object. Although if preferred the buffer strips may be of a length to extend over a greater length than shown, such as over or along a door and the adjacent side panel of the vehicle, across two doors, or even longer, for convenience the strips are made of a substantially uniform length to fit between the side edges of the respective door panels, and are thus long enough to also fit over the front or rear side panels 12 of the vehicle body, and more particularly the rearmost of such panels where the type of damage indicated is most likely to occur, in addition to the door panels.

Each of the buffer strips 10 and 10' comprises substantially the same basic construction, namely an elongated resiliently flexible cushioning body 15 of substantial thickness providing a cushioning ridge 17 and a back portion 18. For lightweight and efficient cushioning with good spring back characteristics the strip body 15 is desirably made from cellular elastomer comprising natural or synthetic rubber, polyurethane, and the like, either closed cell, open cell, or a combination of closed and open cell. Preferably the ridge 17 has a crown of substantial width and which may be slightly narrower than the base or back portion 18, with the side surfaces of the body tapering from the crown to the back portion.

The cushioning body 15 is resiliently flexible so that it springs back to its normal position upon relief of pressure therefrom and the length of the strip is such that there may be a tendency for the strip to sag. To avoid this tendency of the strip body, stiffening means are provided to extend along the back portion 18. While such stiffening means may be incorporated in or inserted within the back portion of the body 15, a desirable, low cost and efficient arrangement comprises providing a substantially coextensive strip of cardboard or paperboard 19 assembled with the back face of the strip body and affording substantial stiffness against deflection in the plane of the back strip stiffener and substantial resistance to any substantial bending across the plane of the stiffener, but permitting sufficient flexing of the stiffener strip with the cushioning body 15 to conform readily to the possibly variable contours of the vehicle side longitudinally along the area to which the buffer strip is attached protectively.

Especially where the cushioning body 15 is made from a material that may be liable to be torn or otherwise damaged, which may be unduly affected by direct sunlight, because of high coefficient of friction may have undue tendency to stick to or resist movement therealong of an object in relative motion, and the like, a cover 20 is desirably applied on and about the assembly. This cover is of a thin material such as a fabric, plastic sheet material, or the like which conforms snugly to the outer surfaces of the cushioning body 15 and has flanges 21 which lap the back face of the stiffening panel 19 and may be suitably secured thereto, although if preferred the flanges themselves may be secured to one another about the base face of the stiffening panel and thus retain the assembly together. By reason of its ready yieldability, the cover 20 remains in conformity with the cushioning body 15 and follows the same when compressed by pressing thereagainst of an object, substantially as indicated in dash outline in FIGURE 2.

In one desirable manner of attaching the buffer strip 10 to one of the doors 13 of the vehicle, especially to prevent unauthorized removal of the buffer strip from the door, sheet metal or like retaining hooks 22 are provided which will engage the respective opposite vertical edges of the door substantially as shown in FIGURES 1 and 6. Such retaining hooks are readily applied when the door is open but when the door is closed removal of the hooks is precluded. Each of the hooks 22 is attached to one of the respective ends of the buffer strip by means of an elastic connector 23 to which the shank portion of the hook is attached as by means of struck out and clenched prongs 24 on the hook shank (FIGS. 4 and 6). This elastic connector 23 extends through a slot 25 in the end portion of the cover 20 and the inner end portion of the elastic member is attached fixedly to the adjacent end portion of the stiffening backing panel 19, as by means of a plurality of staples 27. The prongs 24 and the staples 27 are disposed in a stable, uniformly tensioning anchoring relation to the respective elements so that maximum advantage of the attachments is attained and the hooks 22 will be held tightly onto the respective margins of the door panel 13 by stretching the hooks to a slightly greater distance apart than their normal spacing in the unattached condition of the buffer strip.

In addition to the attaching hooks 22, the buffer strip 10 may be provided with auxiliary retaining magnet means comprising one or more flat magnets 28, each set into a respective recess 29 opening from the back of the stiffening and backing panel 19. Thus, the recess 29 provides a convenient socket for the magnet 28. Preferably, the outer face of the magnet 28 is within or flush with the cover flanges 21 so that the back of the buffer strip assembly will be held reasonably firmly against the supporting surface to be protected. If preferred, of course, the strip may be held onto the vehicle surface entirely by means of a plurality of the magnets 28 along its back. While this may serve adequately to retain the strip 10 in protective position, there is always the danger that the strip may be stolen. Furthermore, of course, the magnet means for attaching the buffer strip is serviceable only on a ferrous surface and would not be applicable where the vehicle body and more particularly the doors thereof are of rigid plastic construction.

Another mode of attaching the buffer strip comprises pressure sensitive adhesive as indicated in FIGURES 1, 3 and 5. Thus, the buffer strip 10' is attached by means of pressure sensitive, or other adhesive 30 which is applied to the back flanges 21 of the cover. Desirably, the adhering qualities of the adhesive 30 are such that stripping of the buffer strip 10' from the door panel 13 or the side panel 12 of the vehicle will result in destruction of the adhesively bonded portions of the buffer strip. For this purpose the adhesive 30 may be a permanent type of adhesive applied to and between the back of the buffer strip and the surface to be protected at the time of mounting the strip, or it may be a pressure sensitive adhesive which is carried by the flanges 21 and is protected by a thin cover strip 31 which is stripped from the back of the buffer strip prior to mounting the buffer in place and effects a firm substantially nonreleasable engagement with the surface of the door panel 13 or the side panel 12. While the adhesive 30 will retain the buffer strip 10' to the point of destruction of the buffer strip, when and if it is desired to remove the buffer strip, the adhesive may be removed from the surface of the vehicle by suitable solvent which, will, of course, be of a type non-damaging to the vehicle finish.

In all forms of the buffer strip the ends are desirably bevelled as shown to avoid one strip striking another or the ends of the strip striking adjacent portions of the vehicle side when the doors 13 are opened, and also to avoid undue resistance to objects or persons that may brush against the ends of the strip.

In order to complement the color of the finish of the surface to which the buffer strips are applied, the covers 20 thereof may be of matching or complementary colors or otherwise decoratively finished. Further, by virtue of the relatively flat crown formation of the buffer strips, advertising material may be carried on the crown portions of the cover, where the strips are supplied as premiums or as courtesy appliances, for display of trademarks, and the like.

It will be understood that variations and modifications may be effected without departing from the spirit of the novel concepts of this invention.

I claim as my invention:

1. A protective buffer strip of the character described comprising:
   an elongated flexible cushioning body of substantial thickness, width and length providing a cushioning ridge having end portions and a back portion;
   an anti-sag and stiffening panel extending substantially coextensively in width and length along and in supporting relation to said back portion, providing substantial stiffness against deflection in the plane of the panel but permitting sufficient flexing of the strip in directions normal to the plane of the panel to conform readily to the possibly variable contours of a surface to which the strip may be attached protectively;
   a one-piece flexible cover over said body and about said panel and said end portions; and
   means for attaching the strip to said surface and comprising:
      flat elastic pieces of substantial width secured to the respective opposite end portions of said panel inside said cover and extending endwise therefrom through said cover; and
      respective retaining hook members secured to the outer end portions of said elastic pieces for retaining engagement with edges along said surface.

2. A buffer strip according to claim 1, comprising staples securing said elastic pieces to said end portions of said panel.

3. A buffer strip according to claim 1, said hook members having a flat shank portions in laminar relation to said elastic pieces, and prongs on said flat shank portions penetrating and securing said flat shank portions to said elastic pieces.

4. A buffer strip according to claim 1, said elastic pieces having inner end portions in laminar relation to the respective end portions of said panel, staples securing said inner end portions of the elastic pieces to the panel end portions, said hook members having flat attachment shank portions in laminar relation to outer end portions of said elastic pieces, and prong means integral with said flat attachment portions shank of the hook members penetrating and clenchingly securing said outer end portions of said elastic pieces and said attachment shank portions permanently together.

References Cited

UNITED STATES PATENTS

| 1,745,902 | 2/1930 | Merrick | 52—717 |
| 2,146,090 | 2/1939 | O'Rourke | 16—86 |
| 2,161,837 | 6/1939 | Tell | 280—152 |
| 2,739,358 | 3/1956 | Kunkel | 49—488 |
| 2,889,165 | 6/1959 | Zientara | 293—1 |
| 3,147,176 | 9/1964 | Haslam | 161—39 |
| 3,173,826 | 3/1965 | Campbell et al. | 161—161 |
| 3,250,560 | 5/1966 | Tullock | 293—1 |

FOREIGN PATENTS 689,935   7/1964   Canada.

ARTHUR L. LA POINT, Primary Examiner

H. BELTRAN, Assistant Examiner

U.S. Cl. X.R.

16—86; 49—488; 52—717; 280—152; 293—62, 71